Nov. 25, 1947.  H. A. PERKINS  2,431,342
SHIMMED DEVICE
Original Filed Aug. 31, 1940   3 Sheets-Sheet 1
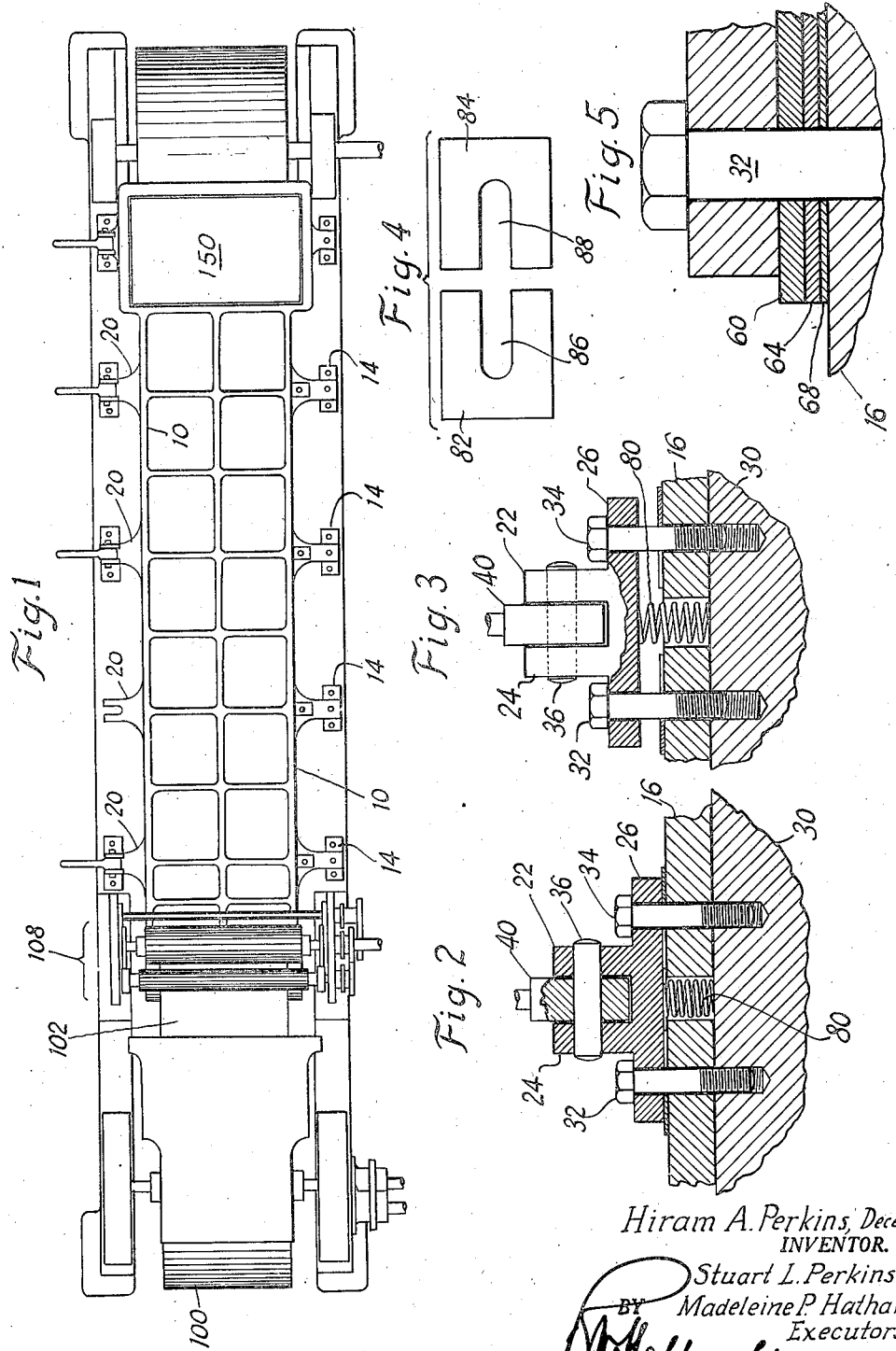
Hiram A. Perkins, Deceased
INVENTOR.
Stuart L. Perkins &
BY Madeleine P. Hathaway
Executors
ATTORNEY Nov. 25, 1947.          H. A. PERKINS                2,431,342
                         SHIMMED DEVICE
            Original Filed Aug. 31, 1940      3 Sheets-Sheet 2
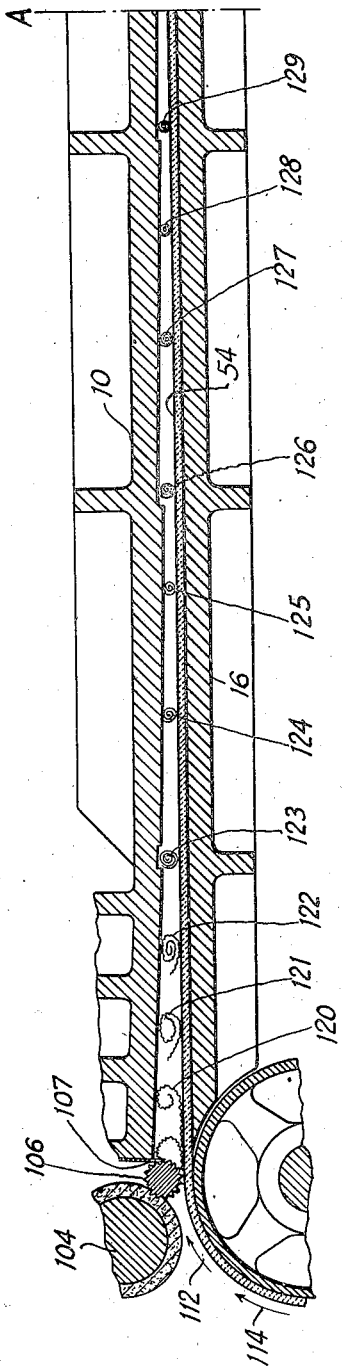
Fig. 6
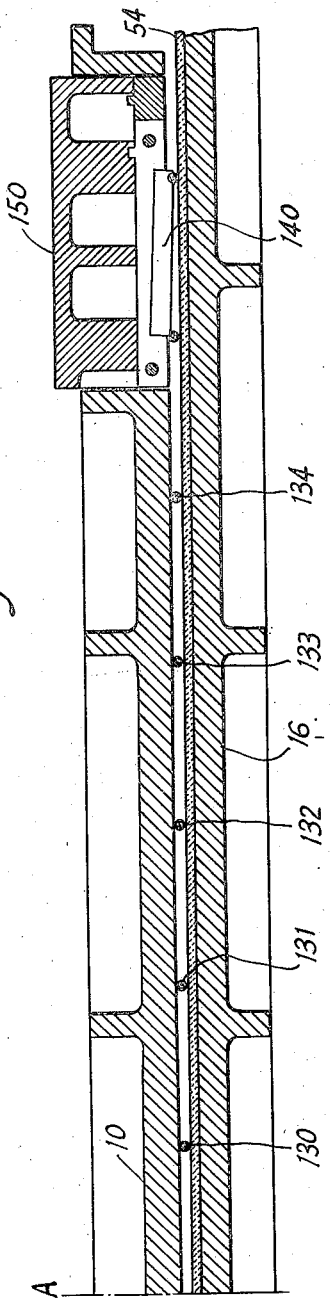
Fig. 6-A
Hiram A. Perkins, Deceased,
           INVENTOR.
      Stuart I. Perkins &
BY  Madeleine P. Hathaway
            Executors
    M. Holbrook ATTORNEY

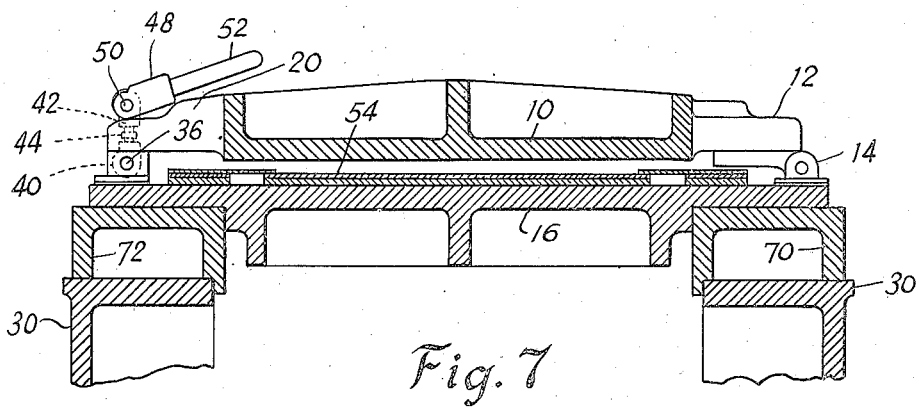
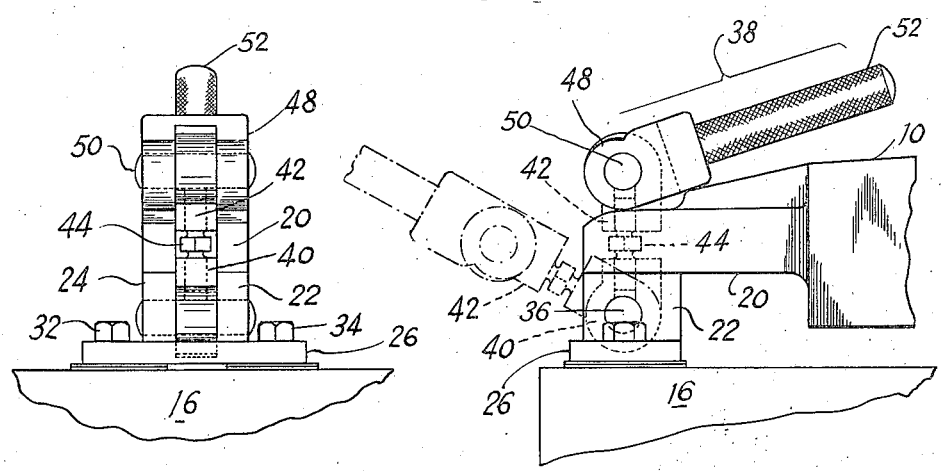
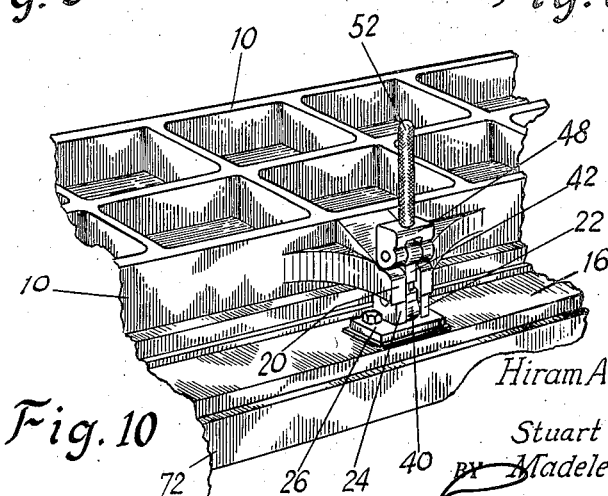

Patented Nov. 25, 1947

2,431,342

UNITED STATES PATENT OFFICE 2,431,342

SHIMMED DEVICE

Hiram A. Perkins, deceased, late of Rochester, N. Y., by Stuart L. Perkins, executor, Rochester, N. Y., and Madeleine P. Hathaway, executrix, Essex County, N. J., assignors to Setter Bros., Inc., Cattaraugus, N. Y., a corporation of New York Original application August 31, 1940, Serial No. 354,945. Divided and this application May 9, 1944, Serial No. 534,788

3 Claims. (Cl. 93—1)

The invention relates to improvements in shimmed devices which are of particular advantage in machines or other devices which, in use or production, require frequent precision changes in the relations of their operative components. The invention involves a specific construction permitting precision adjustments to be made with maximum facility and minimum loss of time. The latter factor is important in production machines requiring a large number of the shimmed devices and necessitating a stoppage (or "outage") of the machine while the devices are utilized to effect uniform precision adjustments for corresponding changes in manufacture. Such a machine is shown in the co-pending U. S. patent application 354,945 (filed August 31, 1940) and has matured into Patent No. 2,357,846 of which this application is a division.

Other objects of the invention, and its various structural features will be better understood from the following description which refers to the accompanying drawings for a disclosure of the preferred embodiment of the invention.

Fig. 1 is a plan of a machine in which several of the illustrative shimmed devices are employed;

Fig. 2 is mainly a vertical section through one of the illustrative shimmed devices;

Fig. 3 is a vertical section on the same plane as Fig. 2 but illustrating the manner in which the device automatically makes the shim spaces accessible for the removal or addition of shims, when the tension bolts are loosened;

Fig. 4 is a detail view in the nature of a plan showing the shim construction and the operative arrangement of the shims in the illustrative devices;

Fig. 5 is a detail view showing a portion of the illustrative device with a plurality of shims of various thicknesses;

Figs. 6 and 6a are vertical sections through the Fig. 1 machine, illustrating a movable upper presser plate construction which requires frequent precision adjustments relative to the fixed lower plate, to provide for the production of rod-like articles of different diameters;

Fig. 7 is a vertical section through the top of the Fig. 1 machine showing the manner in which the illustrated shimmed device is applied;

Fig. 8 is a detail view of the application of the shimmed construction to a device for locking the presser plate of the Fig. 7 construction in a desired fixed relationship to the lower plate construction;

Fig. 9 is an end elevation of the Fig. 8 construction; and

Fig. 10 is a partial perspective of the locking device and the shimmed construction as shown in Fig. 7.

The machine shown in Figs. 1, 6 and 7 of the drawings is employed in the manufacture of small diameter paper rods which are used as medical applicators, and as candy sticks. For some purposes rods of different diameters are required and the same machine is adapted to make these different products. The depth of the horizontal passage between the movable plate construction and the fixed lower plate construction must be changed when rods of a different diameter are to be made.

The presser plate construction is of considerable length and mass and, therefore, a large number of illustrated shimmed devices are employed to precisionally determine the diameter of the rods to be produced, by uniformly changing the spacing of the presser plate from the fixed lower plate construction over the entire operative areas along which the rods are formed. The presser plate construction is indicated at 10, and is shown in Figs. 1 and 10 to have along one side a plurality of hinge constructions, each having a fixed part 14 secured to the base plate construction 16 by the illustrative shimmed device.

At the opposite side of the presser plate 10 and fixed relative thereto are a plurality of forks 20 extending laterally from the presser plate structure, and adapted, in operation, to rest upon the tops of the upper extensions 22 and 24 of the base blocks 26.

The base blocks are fixed to the base plate construction 16 and to the machine base 30 by tension members in the form of cap screws 32 and 34 which extend through the base blocks and are screw threaded into the machine base, as indicated in Figs. 2 and 3.

A pintle or hinge pin 36 extends through each pair of arms 22 and 24 to provide for the rotatable mounting of a cam locking device 38, which locks the lower surfaces of the fork 20 against the tops of the projections 22 and 24, as indicated in Fig. 8 of the drawings. This locking device includes a lower block 40 rotatably mounted between the arms 22 and 24, and an upper block 42 adjustably secured to the lower block 40 by screw threaded connections, such as that shown at 44. The upper block 42 is adapted to pass between the arms of each fork 20 and it is straddled by a U-shaped cam block 48 rotatably mounted with respect to the block 42 by a pin or pintle 50. The pintle may be considered as directly supported by the block 42, or the arms of the fork 20.

Extending upwardly from the center of the block 48 and rigid therewith is a hand lever 52 which is adapted to be moved from the Fig. 8 dotted line position to the Fig. 8 full line position to lock the fork 20 against the tops of the projections 22 and 24 and thus hold the presser plate construction 10 so that its lower surface is at a distance from the upper surface of the carrier belt 54 determined by the number and thickness of the shims, such as those indicated at 60, 64 and 68 in Fig. 5.

The base plate members, such as 70 and 72, have screw threaded openings for the reception of the threaded parts of the cap screws 32 and 34 and the marginal parts of the bedplate construction 16 have aligned openings through which the cap screws pass.

As particularly indicated in Figs. 2 and 3 of the drawings, the bedplate construction 16 has an opening between each pair of cap screws 32 and 34 for each shimmed device. In each of these openings there is a compression spring 80 normally compressed (as indicated in Fig. 2) between the top of the machine base member 72 and the bottom of the member 26. Thus, when it is desired to produce medical applicators of a thickness .001 of an inch greater than those which have been previously manufactured, each member 26 of each shimmed device must be raised .001 of an inch more above the base plate 16. This is done by loosening the cap screws 32 and 34 for each one of the various shimmed devices employed. When these cap screws are loosened 26 is elevated automatically to a position such as that shown in Fig. 3 to make the shim space instantly accessible. Then two of such shims, as thus shown in 82 and 84 of Fig. 4, are slipped in place around the cap screws 32 and 34 and the latter immediately tightened so as to secure the member 26 in its desired relationship.

In the particular shim construction shown, the shim 82 is formed with a slot 86 and a similar slot 88 is formed in the shim 84 so that the shims may be correctly positioned and easily slipped in place around the cap screws. In the reverse operation the shims can be as easily and readily removed. This particular shim construction, because it presents a shim body of the same thickness on opposite sides of each cap screw, maintains a uniform spacing of such members as 16 and 26, over their opposite faces. With this construction the shims may be considered as strung along each cap screw such as 32 or 34, and the latter may therefore be appropriately considered as stringers, or stringer bolts.

As indicated in Fig. 1 of the drawings, there are 10 sets of the illustrative shimmed constructions applied to the heavy casting 10 which forms the main body of the presser plate construction. Thus it will be realized that considerable "outage" is avoided by the use of illustrative shimmed construction, in contrast, to prior art constructions which would require much longer time to make the change in the number of shims at each position, and when, as many as ten separate adjustments are necessary before production can be resumed, the time saved by the present invention is substantial.

When it is further realized that the illustrative machine produces tens of thousands of rods per hour, the loss of production in an outage period of half an hour not only decreases the economic efficiency of the machine, but tends to increase the cost of the product by increasing cost of manufacture. The illustrative invention, in the machine shown, contributes to the ultimate in production costs and thus tends to reduce the price of the product to the ultimate consumer.

The Fig. 1 machine includes a paper supply roll 100 which is rotated so as to continuously supply the web 102 to paper feeding and cutting mechanism disposed adjacent the crimping rolls 104 and 106 and disposed at the position indicated generally at 108 in Fig. 1. Each severed strip of paper is crimped by the rolls 104—106 so that as it is stripped from the roll 106 by the teeth 107 it will be subject to the convoluting action of the carrier belt 54 moving in the direction of the arrows 112 and 114. Thus loosely wound rolls are formed as indicated in Figs. 6 and 6a at 120—127, and beyond that position, as the rolls become more tightly wound and more reduced in diameter, they begin to take on a rod-like construction in the stages indicated at 128–135, inclusive, until they contact the cutters 140 as substantially solid rods. These cutters, act upon the rods to sever them into component rods of uniform lengths, the cutters being held in their operative positions by the cutter head 150. More detailed description of these parts of the rod making machine and its operation will be found in the above identified co-pending application.

While, in conformance with the Federal Statutes, and particularly section 4888 R. S., a preferred embodiment of the invention has been described in detail, it is to be appreciated that the invention is not limited to all of the details thereof, but it is rather of a scope commensurate with the scope of the subjoined claims.

What is claimed is:

1. In a production mechanism having two precisionally spaced units opposed surfaces of which frequently must be fixed at different spacings; the combination therewith, of several shimmed locking devices including one or more metallic shims or spacers, each of said shims having an open ended slot extending inwardly from the perimeter of the shim, adjustable screw-threaded rod-like tension members normally extending through the inner portions of the shim slots and binding the shims tightly between one of said units and parts of the locking devices to fix the spacing of the units at a predetermined precisional value, and compression springs operatively disposed between the parts separated by the shims and normally under compression so as to automatically move at least one of said parts away from the other to present shim access space when the pressure on said shims is released and such movement permitted.

2. In a rod making machine having a fixed bed-plate construction, a movable presser plate construction spaced above the bed-plate, and means for precisionally determining said plate construction spacing for determining the diameter of the rods; said means including locking devices normally fixed to the bed-plate construction along one side thereof and pivotal support devices hinging the plate constructions along the opposite side of the bed-plate construction, stringer bolts extending upwardly from said bed-plate construction and through parts of said locking devices and pivotal support devices, shims slotted from their periphery with the slots adapted to permit the shims to embrace the stringer bolts to maintain a desired number of the shims in alignment along each stringer, and compression springs seated between said parts and the bed-plate construction and normally tending to force said parts upwardly from the bed-plate construction when the grip of the bolts upon the shims is released, the upward movement of said parts making the shim space accessible so that shims may be quickly removed or replaced, said locking devices including locking elements coacting with said presser plate construction to precisionally lock the latter in its operative condition.

3. In combination with first and second units normally held in fixed relationship; a shimmed device for precisionally determining the spacing of at least parts of said units at a predetermined value; said shimmed device including stringer means, opposed abutment members constituting parts of said units presenting opposed surfaces spaced along the stringer means, a plurality of shims normally tightly held in laminated body form along the stringer means and between said members to fix the distance between the units, the shims having open ended slots normally receiving the stringer means to maintain the shims in their operative relationships between said members even after the pressure on the shims has been released but permitting the removal of an individual shim without disturbing the operative relationship of the remaining shims, means for precisionally adjusting at least one of said members lengthwise of the stringer to tightly grip the shims or release them, and an expansible resilient means normally acting to exert diverging forces upon said members to move them apart lengthwise of the stringer means when the adjusting means releases the shims, the stringer means joining said units even after the pressure on the shims is released and while a shim is being removed or another added.

STUART L. PERKINS,
*Executor of the Estate of Hiram A. Perkins, Deceased.*
MADELEINE P. HATHAWAY,
*Executrix of the Estate of Hiram A. Perkins, Deceased.*

REFERENCES CITED

The following references are of record in the file of this patent:

UNITED STATES PATENTS

| Number | Name | Date |
|---|---|---|
| 1,694,758 | Summers et al. | Dec. 11, 1928 |
| 1,564,758 | Crawley | Dec. 8, 1925 |
| 2,091,409 | Lewis | Aug. 31, 1937 |